United States Patent [19]
Baker et al.

[11] Patent Number: 5,235,689
[45] Date of Patent: Aug. 10, 1993

[54] INTERFACE CIRCUIT FOR DUAL PORT DISK DRIVE SYSTEMS

[75] Inventors: Dennis L. Baker, Louisville; Robert E. Dean, Boulder; Steven R. Kemp, Lafayette, all of Colo.

[73] Assignee: Storage Technology Corporation, Louisville, Colo.

[21] Appl. No.: 535,784

[22] Filed: Jun. 11, 1990

[51] Int. Cl.$^5$ .............. G06F 12/00; G06F 15/16
[52] U.S. Cl. .............. 395/425; 364/228.1; 364/238.4; 364/241.8; 364/244.8; 364/248.1; 364/232.3; 364/DIG. 1; 395/500
[58] Field of Search .............. 395/500, 425

[56] References Cited

U.S. PATENT DOCUMENTS 4,888,680 12/1989 Sander et al. .............. 395/500
5,072,378 12/1991 Manka .............. 395/575

*Primary Examiner*—Parshotam S. Lall
*Assistant Examiner*—Ayni Mohamed
*Attorney, Agent, or Firm*—Duft, Graziano & Forest

[57] ABSTRACT

The dual port disk drive interface circuit enables a plurality of dual port disk drives to be interconnected with a plurality of control units in a manner that is transparent to both the dual port disk drives and the control unit. The dual port disk drive interface circuit is interposed between the two channels from n control units and the dual ports of m dual port disk drives to switchably interconnect each control unit with an available dual port disk drive. The interface circuit intercepts the control signals that are generated by both the control units and the dual port disk drives and modifies these control signals to emulate the interconnection of each control unit with a dedicated dual port disk drive. The interface circuit controls the routing of data between the control unit and the available ports on the plurality of dual port disk drives to multiply the number of ports available on the dual port disk drive without modification of the control unit or the dual port disk drive.

3 Claims, 4 Drawing Sheets

INTERFACE CIRCUIT FOR DUAL PORT DISK DRIVE SYSTEMS

FIELD OF THE INVENTION

This invention relates to dual port disk drive systems and, in particular, to an interface circuit that interconnects a plurality of dual port disk drive systems with a plurality of host processors in a manner that enables the host processors to simultaneously and independently access a plurality of the actuators on the dual port disk drive systems.

PROBLEM

It is a problem in the field of disk drive systems to provide a number of fast, simultaneous accesses to the data that is stored on a disk drive system. Existing disk drives include dual port disk drive systems that enable the host processor to perform two simultaneous data accesses, one via each of the ports of the disk drive system. However, the dual port disk drive system still limits the host processor access to the data stored on the disk drive since the host processor must wait for the disk drive to stage and destage the data to the physical media itself. The channels from the control unit to the dual port disk drive are active only when one of the ports of the dual port disk drive are available to read or write data from the associated disk drive. To eliminate the situation where the host processor must wait for data access, additional control units and additional dual port disk drives can be added, although this significantly increases the cost of data retrieval. Therefore, existing systems suffer the inefficiency caused by waiting for the dual port disk drive to retrieve or store data thereon in order to avoid the significant increase in cost in providing additional dual port disk drives and the required additional control units to reduce data access time.

SOLUTION

The above described problems are solved and a technical advance achieved in the field by the dual port disk drive interface circuit that enables a plurality of dual port disk drives to be interconnected with a plurality of control units in a manner that is transparent to both the dual port disk drives and the control units. A pair of control units are typically interconnected with an associated dual port disk drive via a pair of channels, which carry control, status and data signals therebetween. The dual port disk drive interface circuit is interposed between the n channels from n control units and the dual ports of m dual port disk drives to switchably interconnect each control unit with an available dual port disk drive.

The interface circuit intercepts the control signals that are generated by the n control units and the 2 m ports of the m dual port disk drives and modifies these control signals to emulate the interconnection of each control unit with a dedicated dual port disk drive. The interface circuit also monitors the plurality of dual port disk drives to determine which ports are available for access by the associated control units. The interface circuit controls the routing of data, control and status information between the control units and the available ports on the plurality of dual port disk drives to effectively multiply the number of ports available on the dual port disk drive without modification of the control unit or the dual port disk drive. Therefore, by simply adding additional control units, access time to the data stored on these disk drives is significantly improved.

DETAILED DESCRIPTION

The dual port disk drive interface circuit interconnects a plurality of dual port disk drives with a plurality of control units in a manner that is transparent to both the dual port disk drives and the control units. A pair of control units are typically interconnected with an associated dual port disk drive via a pair of data channels, which carry control, status and data signals therebetween. The dual port disk drive interface circuit is interposed between the n channels from n control units and the 2 m ports of the m dual port disk drives to switchably interconnect each control unit with an available dual port disk drive.

The interface circuit intercepts the control signals that are generated by the n control units and the 2 m ports of the m dual port disk drives and modifies these control signals to emulate the interconnection of each control unit with a dedicated dual port disk drive. The interface circuit also monitors the plurality of dual port disk drives to determine which ports are available for access by the associated control units. The interface circuit controls the routing of data, control and status information between the control units and the available ports on the plurality of dual port disk drives to effectively multiply the number of ports available on the dual port disk drive without modification of the control unit or the dual port disk drive. Therefore, by simply adding additional control units, access time to the data stored on these disk drives is significantly improved.

System Architecture

Figure 1:
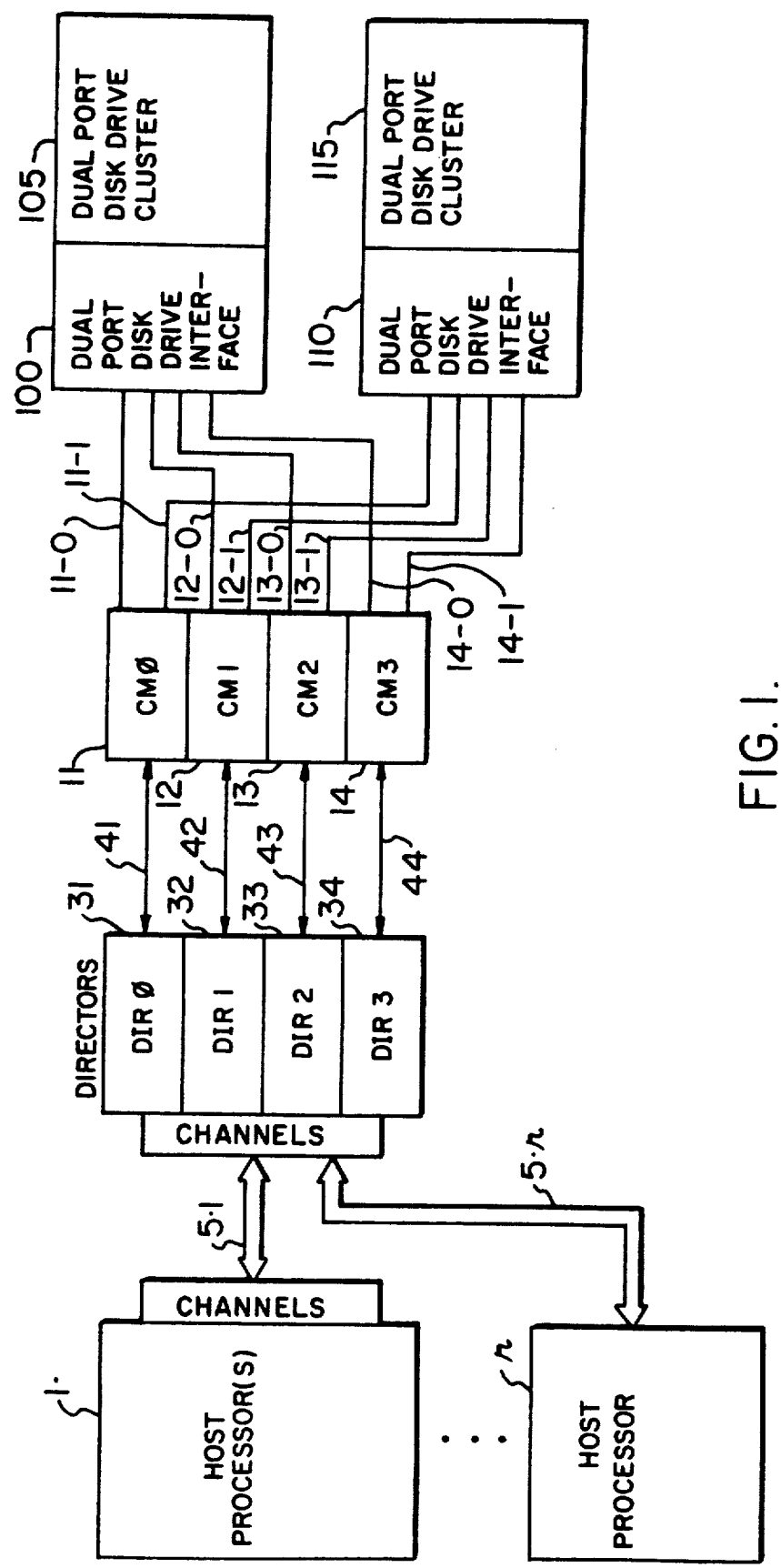
FIG. 1 illustrates, in block diagram form, the overall system architecture of a data processing system which includes the dual port disk drive interface circuit.

FIG. 1 illustrates, in block diagram form, a typical data processing system configuration which includes the interface for dual port disk drive systems. A plurality of host processors 1-r are interconnected in well-known fashion with a plurality of storage directors 31–34 via channels 5-0 to 5-r. The storage directors 31–34 are devices which function to provide improved data management and access on a plurality of disk drives. A typical commercially available produce which performs this function is the IBM 3390 Model 3 Storage Control.

Dual Port Disk Drive Interface Architecture

Figure 2:
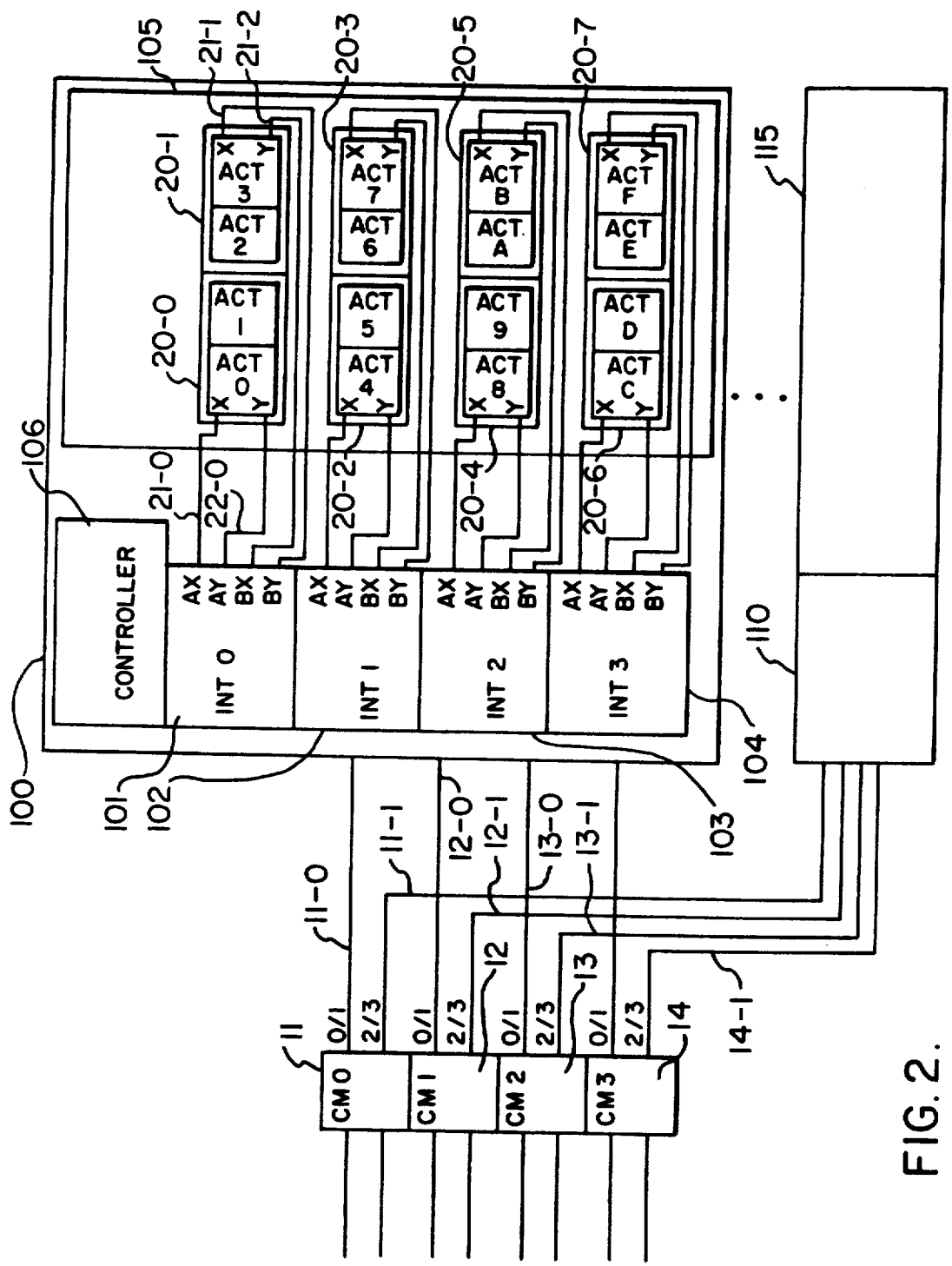
FIG. 2 illustrates, in block diagram form, the basic architecture of the dual port disk drive interface circuit.

FIG. 2 illustrates, in block diagram form, the basic system architecture of the dual port disk drive interface circuit. In FIG. 2, a plurality (ex. - four) of control units (11-14), each of which includes two output channels (ex. 11-0, 11-1) are interconnected with a plurality (ex. - eight) of dual port disk drives (20-0 to 20-7). In the prior art, the channels 11-0, 11-1 from each control unit 11 are typically connected to a single dual port disk drive. In contrast, the dual port disk drive interface 100 functions to connect a plurality (n) of control units 11-14 with a large plurality (m) of dual port disk drives 20-0 to 20-7 contained in dual port disk drive cluster 105. The dual port disk drive interface 100 itself contains a plurality of interface units 101-104, each of which (ex 101) serves a pair of dual port disk drives 20-0, 20-1. Thus, interface unit 101 interconnects a pair of dual port disk drives 20-0, 20-1 to any one of the control units 11-14 in transparent fashion such that the pair of dual port disk drives 20-0, 20-1 appear to be quad port disk drives that are significantly more available than existing dual port disk drives. By incorporating four interface units 101-104 into dual port disk drive interface 100, the four control units 11-14 have access to eight dual port disk drives 20-0 to 20-7, within dual port disk drive cluster 105 served by dual port disk drive interface 100 and a like number of dual port disk drives in dual port disk drive cluster 115 served by dual port disk drive interface 110. Thus, instead of each disk drive 20-0 to 20-7 being accessed by only a pair of control units 11, 12 as would typically be connected to the channel 21-0, 22-0, the use of dual port disk drive interfaces 100, 110 enable four control units 11-14 to access sixteen dual port disk drives contained in dual port disk drive clusters 105 and 115.

As illustrated schematically in FIG. 2, each dual port disk drive 20-0 includes a pair of actuators ACT0, ACT1 which are accessible via both ports x and y. The ports x and y of dual port disk drive 20-0 are connected via conductors 21-0, 22-0 to port AX and AY, respectively, of interface unit 101. Similarly, dual port disk drive 20-1 contains a pair of actuators ACT2, ACT3, each of which is accessible via either port x or port y, which ports are connected via conductors 21-1, 21-2 to corresponding ports BX, BY on interface unit 101.

The architecture illustrated in FIG. 2 functions to interconnect a plurality of dual port disk drives with a plurality of control units. The function of dual port disk drive interface 100 is to enable this interconnection without requiring any protocol or architectural modifications to any of the control units 11-14 or to the dual port disk drives 20-0 to 20-7. Dual port disk drive interface 100 supports four independent simultaneous data transfers between the associated control units 11-14 and available ones of the dual port disk drives 20-0 to 20-7 in the dual port disk drive cluster 105. In order to accomplish this function, dual port disk drive interface 100 must monitor the availability of all of the dual port disk drives in dual port disk drive cluster 105 and manage the attention signalling from the disk drives 20-0 to 20-7 and select signalling from the control units 11-14. This management includes determining which actuator on each of the dual port disk drives 20-0 to 20-7 is connected to which of the plurality of control units 11-14. This includes managing error conditions and preventing the resident control software on the control unit 11 from responding to error conditions in the dual port disk drives 20-0 to 20-7 in a manner that is inconsistent with the operation of the dual port disk drive cluster 105 of dual port disk drives 20-0 to 20-7.

Interface Unit Architecture

Figure 3:
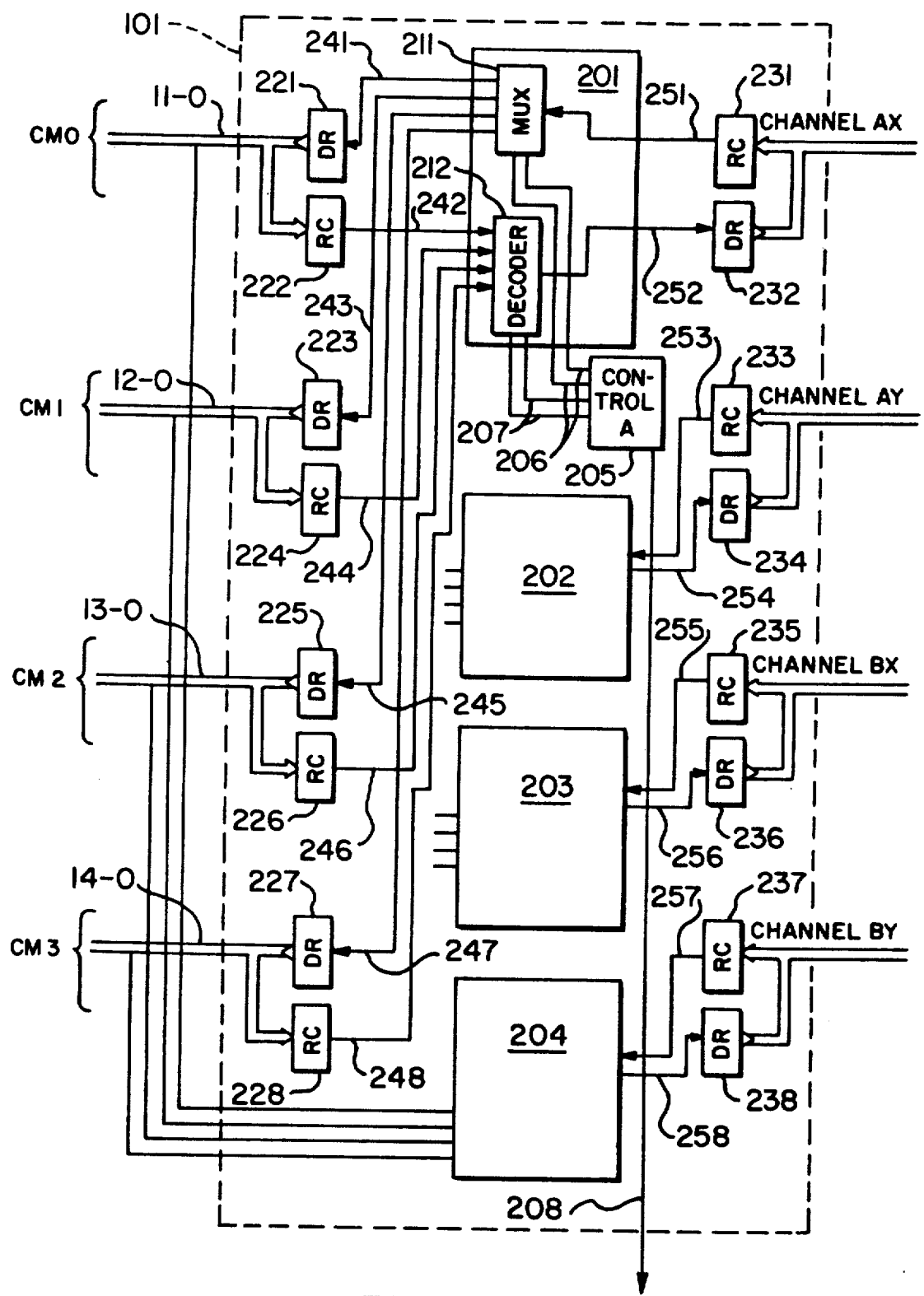
FIGS. 3 and 4 illustrate, in block diagram form, additional details of the circuitry contained within the dual port disk drive interface circuit.

FIG. 3 illustrates in further detail the internal architecture of a typical interface unit 101. Interface unit 101 functions to interconnect a channel 11-0 to 14-0 from each associated control unit 11-14 with a pair of dual port disk drives 20-0, 20-1. Within interface unit 101 is a plurality of interconnection units 201-204 that function to carry the data signals from the control unit channel (11-0 to 14-0) to the selected actuator on the dual port disk drives. For example, channel 11-0 from control unit 11 is interconnected with a corresponding driver 221 and receiver 222 which function to provide unidirectional termination of channel 11-0. Similarly, receiver 231 and driver 232 provide a like termination for channel AX which corresponds to lead 21-0 in FIG. 2 which interconnects port X of dual port disk drive 20-0 with interface unit 101. The interconnection of the corresponding drivers and receivers that terminate channel 11-0 and channel AX is accomplished by interconnection unit 201. Interconnection unit 201 includes a multiplexor 211 and decoder 212. Multiplexor 211 serves to interconnect the data signals received on lead 251 from receiver 231 and transmit these to driver circuits 221, 223, 225, 227, each of which serves a corresponding channel 11-0 to 14-0. In the reverse direction, decoder 212 receives data signals from receivers 222, 224, 226, 228 on leads 242, 244, 246, 248, respectively, and switches a selected one of these leads to lead 252 to apply the received signal to driver 232. The interconnection of the channels and ports of a dual port disk drive is controlled by control circuit 205 via leads 206 and 207, which are connected to the multiplexor 211 and decoder 212 contained within each interconnection unit 201-204. Thus, the circuitry of FIG. 3 provides a multiplexing and interconnection function using standard receiver, driver and multiplexing circuitry.

Controller

Figure 4:
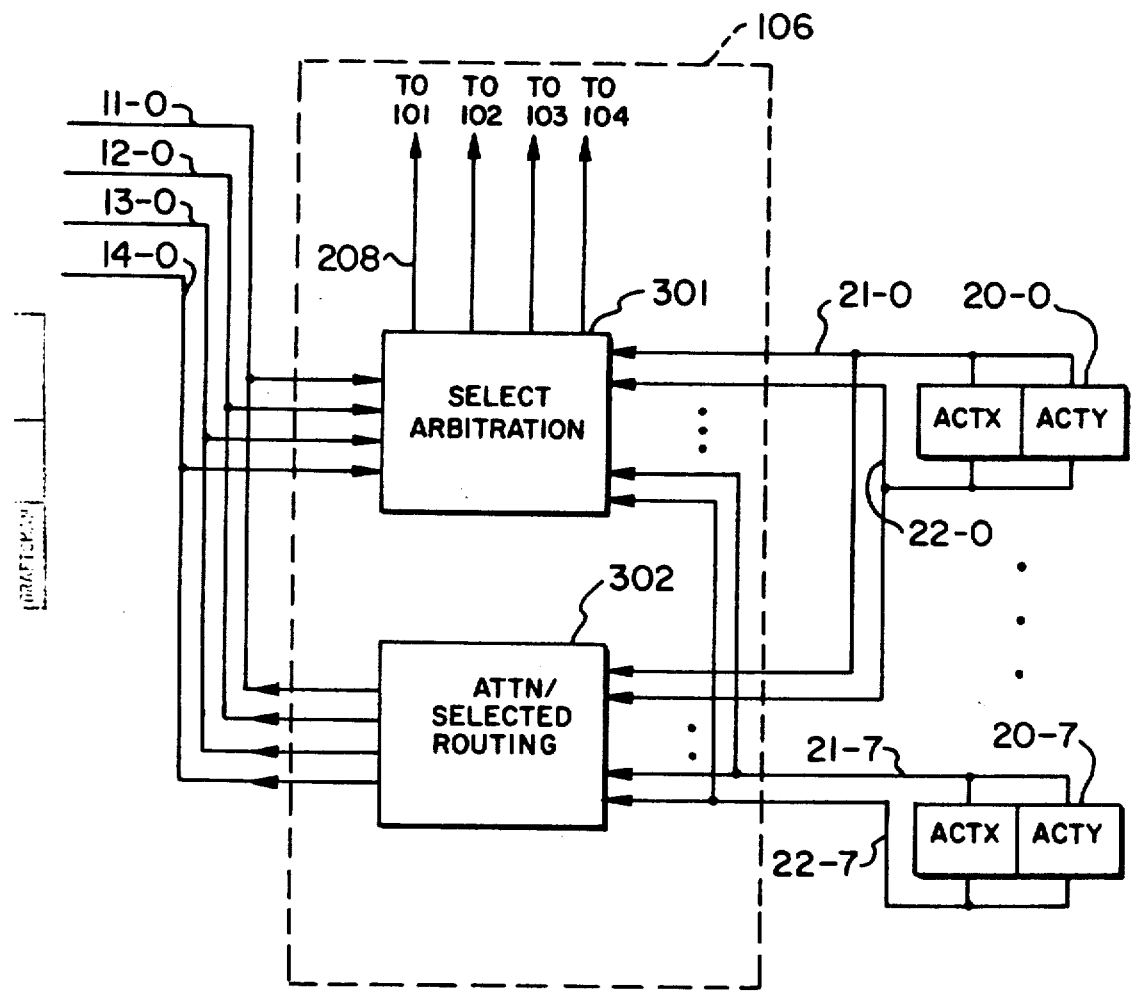

FIG. 4 illustrates the functional architecture of controller 106. Controller 106 includes a select arbitration circuit 301 and an attention/selected routing circuit 302. The function of these two circuits is to interconnect the control signals produced by the control units 11-14 and the plurality of dual port disk drives 20-0 to 20-7 in a manner that is transparent to these devices. The difficulty with such an arrangement is that each control unit 11 assumes that it is connected directly to a single port of the dual port disk drive 20-0 via channel 11-0. Control unit 11 transmits control signals to regulate the selection of the ports x and y of the attached dual port disk 20-0 drive and perform various maintenance and control operations in response to the signals received in return from the dual port disk drive 20-0. However, unbeknownst to control unit 11, channel 11-0 is connected to a selected one of the x, y ports of any of the plurality of dual port disk drives 20-0 to 20-7. In particular, control unit 11 transmits a select signal on channel 11-0 to select either the x or y actuator of the dual port disk drive that is expected to be connected to channel 11-0. Select arbitration circuit 201 monitors the selected lines that are included in conductors 21-0 to 22-7 that are connected to the associated plurality of dual port disk drives 20-0 to 20-7 to determine where there are idle actuators in the dual port disk drive cluster 105. In response to the availability of at least one port of the dual port disk drive 20-0 through 20-7 in dual port disk drive cluster 105, select arbitration circuit 301 generates and transmits dual port disk drive selection signals to the interface unit associated with the available dual port disk drive. Assume for example, that dual port disk drive 20-0 is available, and select arbitration circuit 301 transmits control signals on lead 208 to interface unit 101 where they are received by control circuit 205. The control signals transmitted by controller 106 indicate the selected dual port disk drive 20-0 as well as the one of channels 11-0 to 14-0 requesting access to a disk drive. In response to this received information, control circuit 205 transmits a pair of select signals, identical to those transmitted by control unit 11, one each to the x and y ports of the selected dual port disk drive 20-0. These select signals are transmitted in a time delayed fashion with the select signal to the x port of dual port disk drive 20-0 being transmitted a small interval of time earlier than the select signal transmitted to the y port of dual port disk drive 20-0. The time delay in the select signals is to avoid contention between the two ports of the selected dual port disk drive 20-0. In response to the select signals received by dual port disk drive 20-0 from control circuit 205, a return signal is produced by dual port disk drive 20-0 to attention/selected routing circuit 302 indicative of the port that was selected as a result of the two transmitted select signals. The response signal received from selected dual port disk drive 20-0 is regenerated and transmitted by attention/selected routing circuit 302 to the requesting control unit 11 via channel 11-0. Select arbitration circuit 301 transmits further control signals via lead 208 to interface unit 101 to activate control circuit 205 to enable multiplexor 211 and decoder 212 in interface circuit 101 to enable the transfer of data between control unit 11 and the selected dual port disk drive 20-0.

When one port (x) of a dual port disk drive (20-0) is in use and a control unit 11 requests access to that dual port disk drive 20-0, dual port disk drive interface 100 selects the second port (y) of the requested dual port disk drive 20-0 to access the other actuator of the requested dual port disk drive 20-0.

Maintenance Features

When a control unit detects an error in the connected dual port disk drive, it disables the port of the dual port disk drive that was in use when the error occurred. The control unit then proceeds to use only the remaining port on the dual port disk drive. The difficulty with this arrangement is that dual port disk drive interface circuit 100 does not directly connect the control unit with a predesignated dual port disk drive but switchably interconnects the control units 11-14 with a plurality of dual port disk drives 20-0 to 20-7 in the dual port disk drive cluster 105. Therefore, when a control unit detects a failure and attempts to disable the port associated with this error, dual port disk drive interface circuit 100 must determine the identity of the failed port on one of the plurality of dual port disk drives 20-0 to 20-7 resident in dual port disk drive cluster 105. This procedure is necessary because the control unit, as it subsequently requests access to the dual port disk drives, will again encounter the failed port as it is switchably interconnected by dual port disk drive interface 100 and interpret this encounter as a failure of the second port of the dual port disk drive and cease communication entirely. In order to avoid this problem, controller 106 intercepts the control unit port lockout signals and denies access to the failed port on the one dual port disk drive to all requesting control units 11-14. This controlled lockout avoids the erroneous second port lockout by the control unit.

In operation, when a control unit 11 selects a particular dual port disk drive (ex. 20-0), control unit 11 is unaware of the port selected until the selected dual port disk drive 20-0 returns a port selected signal to indicate which port (x or y) it is selected on.

While a specific embodiment of this invention has been disclosed, it is expected that those skilled in the art can and will design alternate embodiments of this invention that fall within the scope of the appended claims.

We claim:

1. An interface circuit connected to and interconnecting at least two host processor control units and n dual port disk drives, where n is a positive integer greater than 1, comprising:

means, connected to said host processor control units, for emulating the operation of a single dual port disk drive, including:
means responsive to port select signals received from a requesting one of said host processor control units for identifying idle ones of said n dual port disk drives,
means for selecting one of said identified idle dual port disk drives,
means, responsive to said selecting means, for generating drive selected signals identical to those received from said selected dual port disk drive,
means for applying said generated drive selected signals to said requesting host processor control unit, means, connected to said dual port disk drives, for emulating the operation of said host processor control units, including:
means for generating port select signals identical to those received from said requesting host processor control unit,
means for applying said generated port select signals to said selected identified idle dual port disk drive, means connected to said host processor control units and said dual port disk drives for interconnecting said host processor control units and said dual port disk drives to enable the bidirectional transmission of data therebetween; and means responsive to drive selected signals received from said selected dual port disk drive for enabling said interconnecting means to interconnect said requesting host processor control unit and said selected dual port disk drive to enable the bidirectional transmission of data therebetween; and wherein said identifying means is responsive to port lockout signals received from said requesting host processor control unit to disable an identified port on said selected dual port disk drive from access by any of said host processor control units.

2. An interface circuit for maintaining up to 2 m simultaneous independent data transfers between m host processor control units and n dual port disk drives, where n and m are both positive integers greater than 1 comprising:

means, connected to said m host processor control units, for emulating the operation of a dual port disk drive dedicated to each of said m host processor control units, including:
means responsive to port select signals received from a requesting one of said m host processor control units for identifying idle ones of said n dual port disk drives,
means for selecting one of said identified idle dual port disk drives,
means, responsive to said selecting means, for generating drive selected signals identical to those received from said selected dual port disk drive, means for applying said generated drive selected signals to said requesting host processor control unit, means, connected to said dual port disk drives, for emulating the operation of said host processor control units, including:

means for generating port select signals identical to those received from said requesting host processor control unit, means for applying said generated port select signals to said selected identified idle dual port disk drive, means connected to said m host processor control units and said n dual port disk drives for interconnecting said m host processor control units with m of said n dual port disk drives to enable the bidirectional transmission of data therebetween; and means responsive to drive selected signals received from said selected dual port disk drive for enabling said interconnecting means to interconnect said requesting host processor control unit and said selected dual port disk drive to enable the bidirectional transmission of data therebetween; and wherein said identifying means is responsive to port lockout signals received from said requesting host processor control unit to disable an identified port on said selected dual port disk drive from access by any of said host processor control units.

3. In an interface circuit connected to and interconnecting m host processor control units and n dual port disk drives, where n and m are both positive integers greater than 1, a method of maintaining up to m simultaneous data transfers between said m control units and m selected ones of said n dual port disk drives, comprising the steps of:

emulating the operation of a single dual port disk drive, including:

identifying, in response to port select signals received from a requesting one of said host processor control units, idle ones of said n dual port disk drives, selecting one of said identified idle dual port disk drives, generating drive selected signals identical to those received from said selected dual port disk drive;

applying said generated drive selected signals to said requesting host processor control unit, emulating the operation of said host processor control units, including:

generating port select signals identical to those received from said requesting host processor control unit, applying said generated port select signals to said selected identified idle dual port disk drive, interconnecting said requesting host processor control unit and said selected dual port disk drive to enable the bidirectional transmission of data therebetween, and wherein said identifying step includes:

disabling, in response to port lockout signals received from said requesting host processor control unit, an identified port on said selected dual port disk drive from access by any of said host processor control units.

* * * * *